United States Patent
Nguyen et al.

(10) Patent No.: US 6,411,915 B1
(45) Date of Patent: Jun. 25, 2002

(54) METHOD AND APPARATUS FOR CALIBRATING A NON-CONTACT RANGE SENSOR

(75) Inventors: Van-Duc Nguyen, Albany; Victor Nzomigni, Niskayuna; Charles Vernon Stewart, Clifton Park, all of NY (US); Kishore Bubna, Pittsburg, CA (US); Lila Abdessemed, Schenectady, NY (US); Nathalie Claire Poirier, Rueil-Malmaison (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/360,032

(22) Filed: Jul. 23, 1999

Related U.S. Application Data

(60) Provisional application No. 60/094,444, filed on Jul. 28, 1998, and provisional application No. 60/094,443, filed on Jul. 28, 1998.

(51) Int. Cl.[7] .............................. G06F 19/00; G06F 9/00
(52) U.S. Cl. .......................... 702/104; 702/85; 702/94; 382/294; 382/298; 700/57
(58) Field of Search ........................... 702/85, 94, 104, 702/150–153; 382/115, 190, 199, 294, 295, 296, 298; 700/57–59, 182, 186, 193–195

(56) References Cited

U.S. PATENT DOCUMENTS

| | | | |
|---|---|---|---|
| 4,908,782 A | | 3/1990 | Pekaret et al. |
| 4,945,501 A | * | 7/1990 | Bell et al. ...................... 702/95 |
| 5,047,966 A | | 9/1991 | Crow et al. |
| 5,208,763 A | | 5/1993 | Hong et al. |
| 5,495,540 A | * | 2/1996 | Frankot et al. ............. 382/294 |
| 5,521,847 A | | 5/1996 | Ostrowski et al. |
| 5,627,771 A | | 5/1997 | Makino |
| 5,715,166 A | * | 2/1998 | Besl et al. .................. 700/182 |
| 5,990,901 A | * | 11/1999 | Lawton et al. ............... 382/115 |
| 6,041,138 A | * | 3/2000 | Nishida ....................... 382/197 |

FOREIGN PATENT DOCUMENTS

EP          381 067         8/1990

OTHER PUBLICATIONS

"Method and Apparatus for Finding Shape Deformations in Objects having Smooth Surfaces," Nguyen et al., Ser. No. 09/353,986 (GE docket RD–27276), filed Jul. 15, 1999.

"Accurate Internal Camera Calibration Using Rotation, with Analysis of Sources of Error," GP Stein, Proceedings of the International Conference on Computer Vision, IEEE Comp. Soc. Press, vol. Conf. 5, Aug. 1995, pp. 230–236.

"CCD Camera Calibration and Noise Estimation," Proceedings of the Computer Society Conference on Computer Vision and Recognition, IEEE, vol.–, Mar. 1992, pp. 90–95.

"Fast and Robust Registration of 3D Surfaces Using Low Curvature Patches," V–D Nguyen; V. Nzomigni, CV Stewart, International Conference on 3D Imaging and Modeling, Ottawa, Oct. 1999, pp. 1–8.

* cited by examiner

*Primary Examiner*—Bryan Bui
(74) *Attorney, Agent, or Firm*—Jean K. Testa; Donald S. Ingraham

(57) ABSTRACT

A method for calibrating a non-contact range sensor comprises the steps of employing the range sensor to obtain a range image of an object to be inspected. The range image is registered with a reference image of the object thereby providing registered data. The reference image may be derived through computer assisted drawing (CAD) data. Normal deviations between the registered data and the reference image are computed. Noise is filtered from the normal deviations. A plurality of bias vectors and a covariance matrix are estimated based on the normal deviations, stored in memory as a lookup table comprising geometric correction factors for the sensor. Images of the object subsequently obtained by the sensor are compensated in accordance with the lookup table.

12 Claims, 4 Drawing Sheets

BIAS COMPONENT IN Y

BIAS COMPONENT IN X

BIAS COMPONENT IN Z

METHOD AND APPARATUS FOR CALIBRATING A NON-CONTACT RANGE SENSOR

CROSS REFERENCE TO RELATED APPLICATIONS

This application claims priority to Provisional Application No. 60/094,444 entitled "Precise and Accurate Surface Reconstruction Using a Priori Model and Dense Data", filed on Jul. 28, 1998, and to Provisional Application No. 60/094,443, entitled, "Finding Shape Deformations in Airfoils or Generalized Cylinders," filed on Jul. 28, 1998, both of which are incorporated herein by reference.

BACKGROUND OF THE INVENTION

The present invention relates generally to digital image processing techniques and in particular to a method and apparatus for calibrating a non-contact range sensor of the type used to obtain digital images of objects for the purpose of inspecting the objects for defects.

Currently, automated inspection is performed on manufactured objects such as airfoils (e.g. turbine blades) by obtaining digital data and images of the objects to detect defects in them. Airfoils, including forged blades such as those used for aircraft engines, are inspected for deformation parameters such as platform orientation, contour cross-section, bow and twist along stacking axis, thickness and chord length at given cross-sections. One method of obtaining digital data representing these parameters is through coordinate measurement machines (commonly known as "CMMs"). CMM's translate and rotate a probe in contact with the surface of the object to sample points on the object's surface.

Another means of obtaining digital representations of these parameters is with full-field non-contact range sensors. Non-contact full-field sensors scan the external surfaces of opaque objects using laser or white light. These sensors are capable of scanning the part quickly while obtaining large quantities of data. Examples of non contact sensors include sensors that are based on laser line grating and stereo triangulation; and based on single laser line scan plus rotating the part. Another non contact sensor is based on phased-shift Moiré and white light.

The raw data points obtained by non-contact sensors, however, provide a very low degree of accuracy and thereby, generate noisy normal deviations that yield unacceptable precision and accuracy when the data are used to reconstruct the surface of an object in order to detect deformations and defects of the object. Because full-field sensors are relatively new, efforts to calibrate and characterize them to increase their accuracy have been few and largely unsuccessful.

BRIEF SUMMARY OF THE INVENTION

In an exemplary embodiment of the present invention, a method for calibrating a non contact range sensor comprises the steps of scanning the object to be inspected with the range sensor to obtain a range image of the object. The range image is registered with a reference image of the object to provide registered data. Normal deviations between the registered data and the reference image are computed. Noise is filtered from the normal deviations. A plurality of bias vectors and a covariance matrix are estimated and used to generate a lookup table comprising geometric correction factors. The range image of the object is compensated in accordance with the lookup table.

BRIEF DESCRIPTION OF THE DRAWINGS

Referring now to the drawings wherein like elements are numbered alike in the several Figures.

DETAILED DESCRIPTION OF THE INVENTION

For purposes of this specification, sensor calibration is defined as the process of identifying bias errors in measurements obtained by the sensor such that later-obtained measurements can be compensated for the errors.

Generally, according to the method of the present invention, the sensor is calibrated in a sequence of steps as follows. The sensor is employed to obtain a range image of an object to be inspected. The sensor scans the object as the object translates and rotates through its working volume. Thus, range data points are obtained. The data points are arranged in data sets, also referred to herein as a scanned image, and the data sets are registered to one or more reference data sets. Reference data comprises geometric ideal models of the object and is also referred to herein as a reference image. The scanned image and the reference image are registered to each other such that both are represented in a common coordinate system. Normal deviations are then computed from the scanned image to the registered image. Random noise, which describes precision, and bias error, which describes accuracy, are estimated from the normal deviations and stored in a lookup table. The look up table is employed for 3D geometric correction and multiple view integration of images obtained by the sensor.

Figure 1:
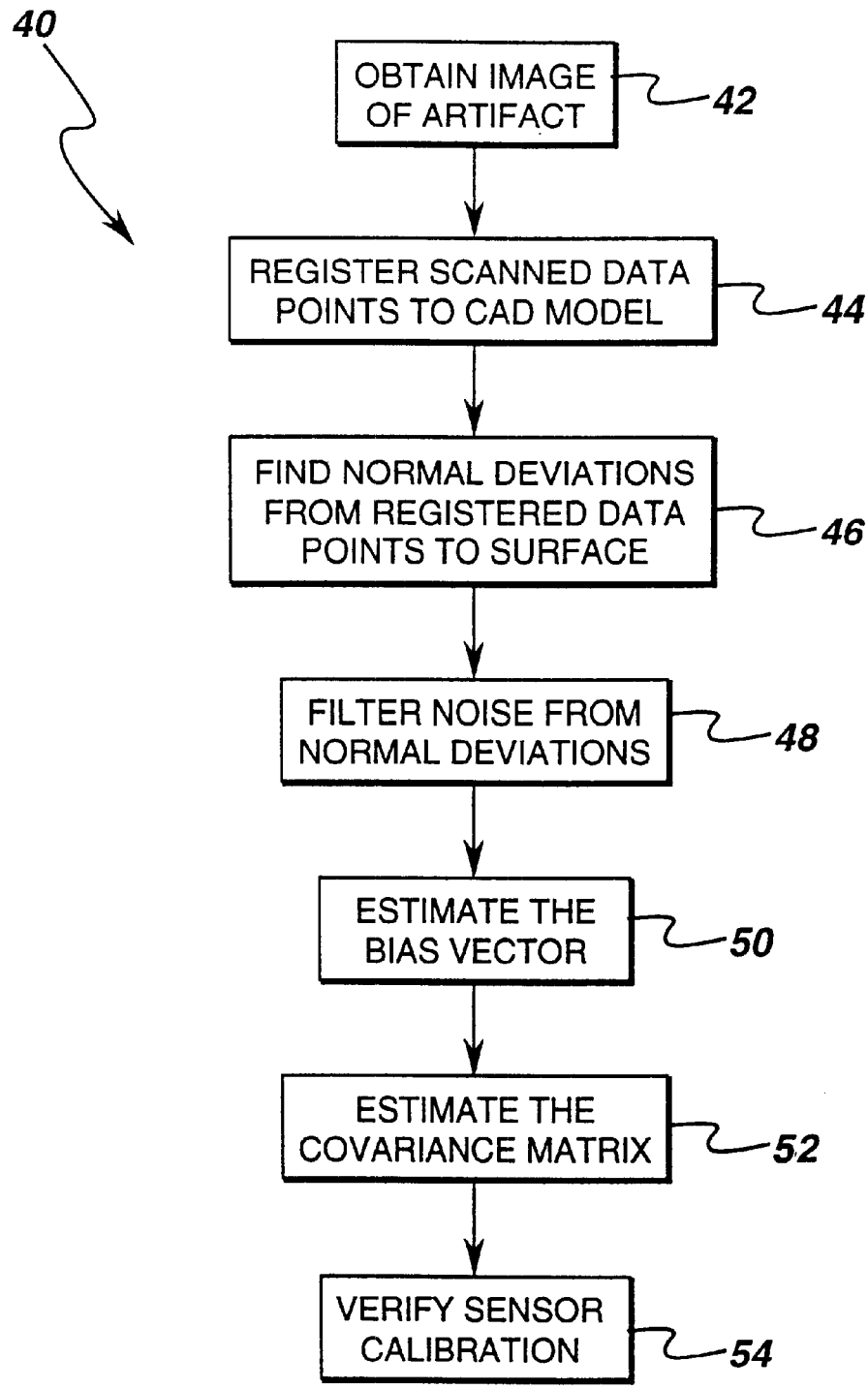
FIG. 1. is a flowchart of the method of the present invention, of calibrating a full-field non-contact range sensor.

One embodiment of the method of the invention is illustrated in FIG. 1. Step 42 of method 40 obtains a scanned image of an object to be inspected by translating the object on a translation stage, and rotating the object on a rotation stage along a plurality of directions throughout the 3 dimensional working volume of the object. This step is accomplished using typical scanning and digital imaging systems and techniques.

In step 44, a reference image comprising data points corresponding to the ideal shape of the object, and the scanned image of the actual object are registered. One method of obtaining a reference image with which to register the scanned image is to grind a planar object to achieve flatness. Alternatively, the object itself is measured using a more accurate sensor like a CMM, and the measurements stored as reference data. Alternatively, computer assisted drawing (CAD) data or other engineering or design specifications may be used to provide a reference image.

Figure 4:
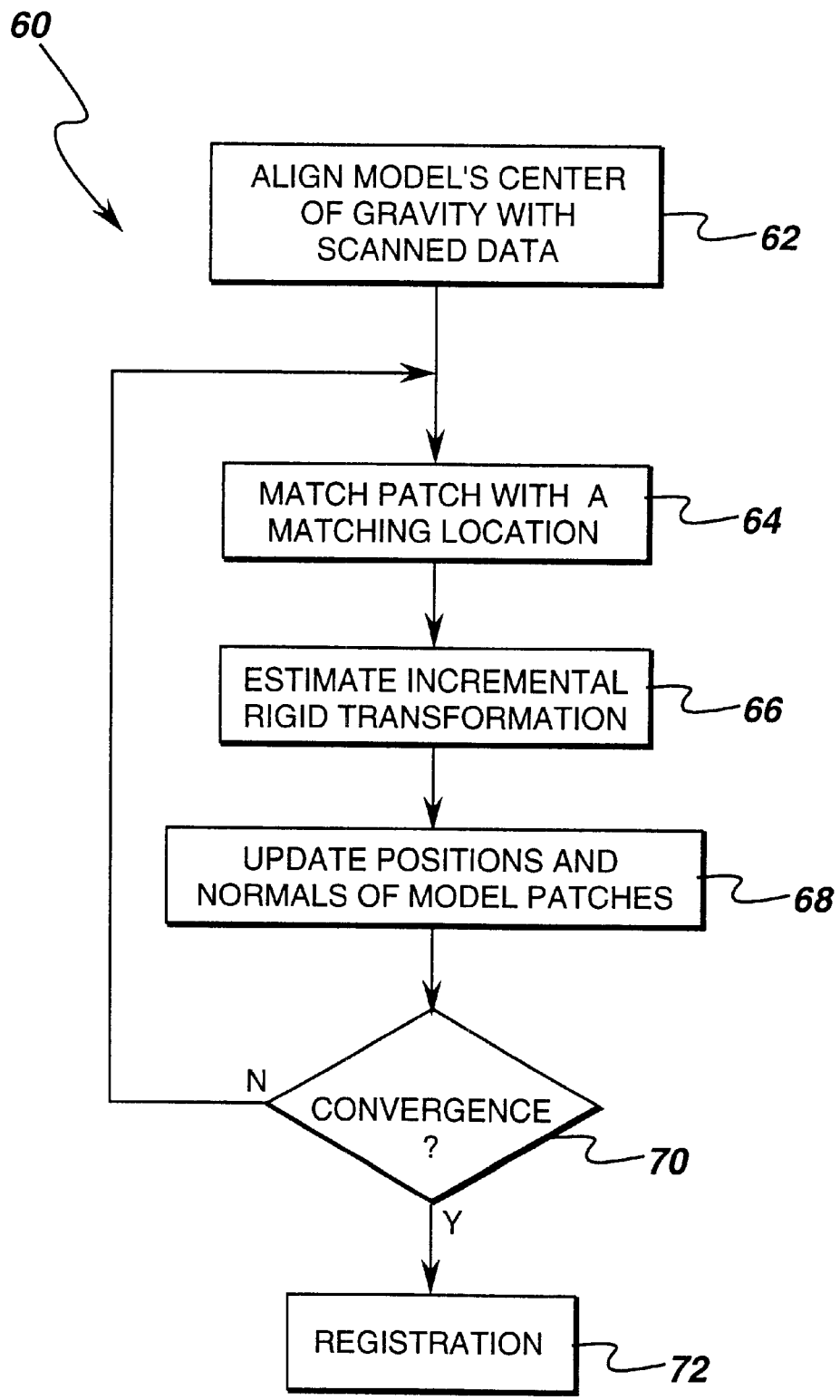
FIG. 4. is a flowchart of one method of registering a range image of an object with a reference image of the object.

As illustrated in FIG. 4, one embodiment of the invention uses a Robust-Closest-Patch (RCP) algorithm in the registration process. The RCP algorithm is the subject of co-pending application Ser. No. 09/303,241, entitled "Method and Apparatus for Image Registration", filed Apr. 30, 1999 and assigned the assignee of the present invention and hereby incorporated by reference. According to the RCP algorithm, given an initial rigid pose, each scanned image data point is matched to its nearest data point on the reference image as indicated at 62 and 64 of FIG. 4. In other words, the RCP algorithm matches reference image data points and scanned image data points based on the current pose estimate, and then refines the pose estimate based on these matches.

In one embodiment of the invention, pose is solved by singular value decomposition (SVD) of a linear system in six parameters. One embodiment of the invention employs a linear and symmetric formulation of the rotation constraint using Rodrigues' formula rather than quaternions or orthonormal matrices. This is a simplified method of solving for pose. In one embodiment of the invention, a typical M-estimator is employed to estimate both the rigid pose parameters and the error standard deviation to ensure robustness to gross errors in the data.

The 3D rigid transformation that best aligns these matches is determined at step 66 and applied in step 68 of FIG. 4. The foregoing steps are repeated using the most recently estimated pose until convergence. Accordingly, registration step 44 of FIG. 1 solves for the translation direction and the axis of rotation by which the reference image may be represented in the scanned image coordinates.

In step 46 of FIG. 1, normal deviations from registered data points to data points of the scanned image are found. In one embodiment of the invention, an approximate normal distance between model data points, also referred to herein as patches, and data surface points is used, avoiding the need to estimate local surface normal and curvature from noisy data. To accomplish step 46, one embodiment of the invention computes the raw error The raw error $e_{ij}$ along the normal, $\vec{n}_k$, for the given direction $D_K$, at the point $\vec{q}_{ij}$, according to the relationship:

$$e_{ij} = (\vec{q}_{ij} - \vec{P}hd\ ij) \cdot \vec{n}_k \qquad (1)$$

Random noise is filtered from the normal deviations using a Gaussian or mean filter. In one embodiment of the invention the projection $b_{ijk}$ of the bias vector $b_{ij}$ at each point is determined by:

$$\vec{b}_{ijk} = b_{ij} \cdot \vec{n}_k \qquad (2)$$

for the mean filter described by:

$$B_{ij} = \frac{1}{|M_i|} \sum_{Mi} e_{ij} \qquad (3)$$

where $M_i$ is a small region surrounding the data point.

The filter described in equation 3 above is utilized to find the projection $b_{ijk}$ of bias vector $b_{ij}$ at each data point, as indicated in step 50.

Figure 2:
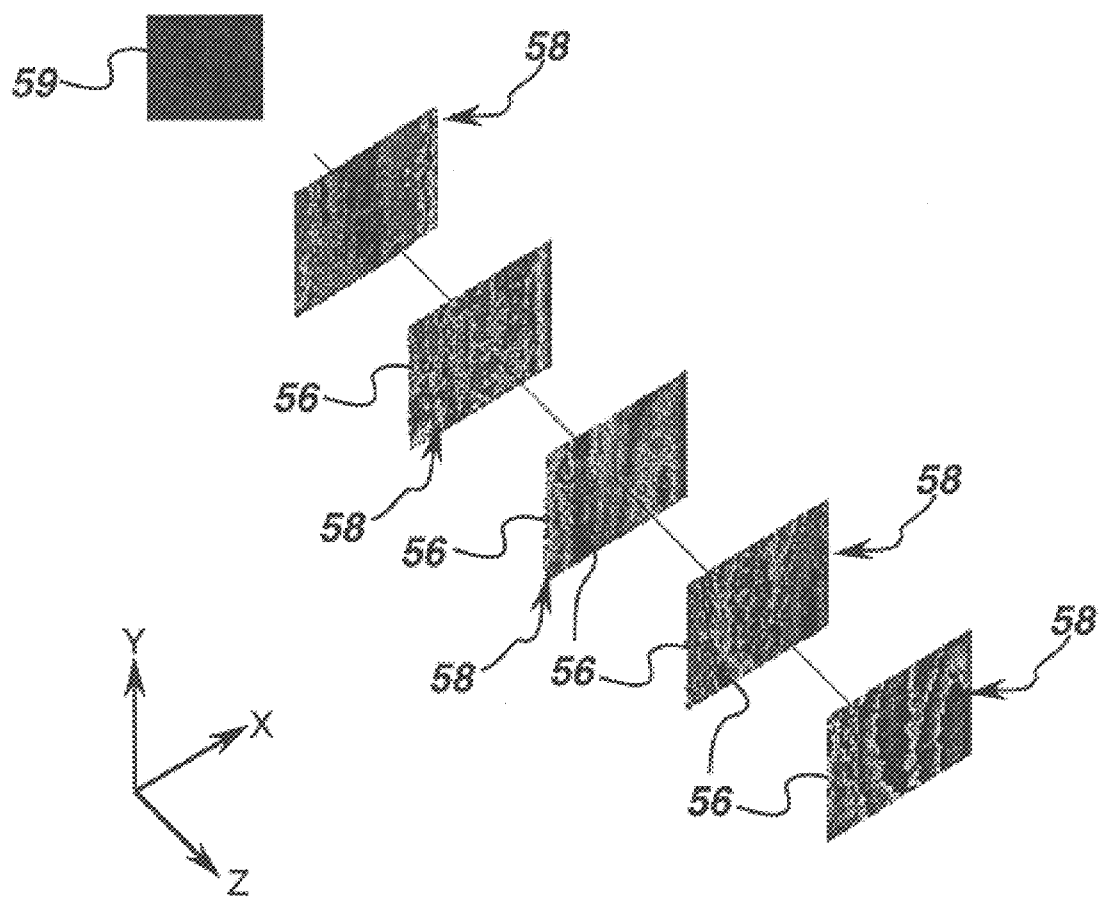
FIG. 2. is a perspective view of a plurality of projections of a bias vector disposed along the z-axis.

FIG. 2, illustrates a portion of the step 50 of estimating bias vectors. Bias values 56 are determined for a set of planes 58, from the plane 59 closest to the sensor, to the plane furthest from the sensor, along the z axis. A 3D geometric correction table is built by finding the projection of the bias vectors at regularly (evenly) spaced grid points p in the 3D volume of the object. To accomplish this the projections of the bias vectors found at each point $q_{ij}$ are down-sampled and interpolated. One embodiment of the invention employs Gaussian interpolation to interpolate the projections of the bias vectors.

Returning to FIG. 1, step 50 estimates bias vectors as a function of surface location and orientation based upon the projection of the bias vector along a plurality of normals, all projections stemming from the same grid point. The previous steps provide, for each direction $D_k$, the normal to the planes $\vec{n}_k$, and the projections of the bias vector, $b_{pk}$, at each grid point p.

In one embodiment of the invention, the following system of relationships are solved for each grid point p of the 3d working volume of the object to be inspected.

$$Nb_p = vhd\ p \qquad (4)$$

Where N is the k×3 matrix of the normal vectors, $$N = \begin{bmatrix} n_1^T \\ \vdots \\ n_k^T \end{bmatrix} \qquad (5)$$

And wherein $b_p$ is the bias vector to be found at this grid point, and wherein $v_p$ is the k×1 vector of the bias projections:

$$V_p = \begin{pmatrix} b_{p1} \\ \vdots \\ b_{pk} \end{pmatrix} \qquad (6)$$

wherein $b_p$ is the bias vector to be found grid point p, and $v_p$ is the k×1 vector of the bias projections from gridpoint p.

Figure 3:
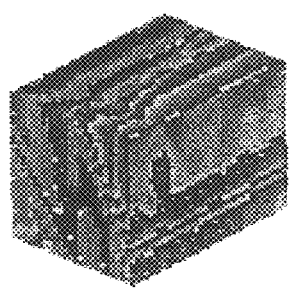
FIG. 3. is a perspective view of the x, y and z components of the bias vector illustrated in FIG. 2.
Figure 3:
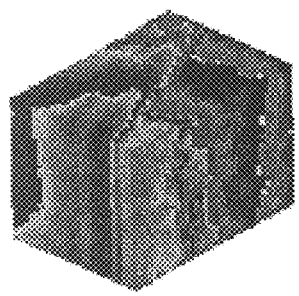
Figure 3:
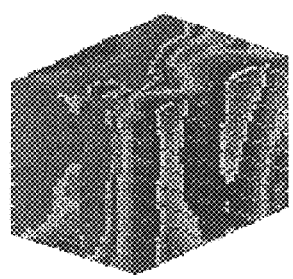

In one embodiment of the invention the system described above is solved by applying a typical singular value decomposition (SVD) algorithm when the rank of N is 3. Thus, the smooth field of bias vectors is obtained. FIG. 3 illustrates three components X, Y and Z of bias vector components in a 3D grid.

In FIG. 1 at step 52, a covariance matrix is estimated. The covariance matrix provides a model of the random noise and precision of the range sensor based on data points corrected for bias as described above. Principal eigenvalues and eigenvectors of the covariance matrix are found and analyzed to simplify the noise model. To accomplish this, the variance in normal direction $\vec{n}_k$ at the grid point p is determined by the relationship:

$$s_{pk}^2 = \frac{\sum j(e_{jk} - b_{pk})^2}{M_{pk} - 1} \qquad (7)$$

where $e_{jk}$ is the error previously calculated at the point j and $M_{pk}$ is the number of points taken over a small region around p.

In one embodiment of the invention, the relationship between $S_{pk}^2$ and the covariance matrix $S_p$ at the point p is described by:

$$n_k^T S_p n_k = s_{pk}^2 \qquad (8)$$

wherein:

$$S_p = \begin{pmatrix} S_{11} & S_{12} & S_{13} \\ S_{12} & S_{22} & S_{23} \\ S_{13} & S_{23} & S_{33} \end{pmatrix} \qquad (9)$$

Wherein $n'_k$ is the vector:

$$n'_k = \begin{pmatrix} n_{kz}^2 \\ 2 \times n_{kz} \times n_{ky} \\ 2 \times n_{kz} \times n_{kz} \\ n_{ky}^2 \\ 2 \times n_{ky} \times n_{kz} \\ n_{kz}^2 \end{pmatrix} \quad (10)$$

wherein $\vec{n}_k = (n_{kz}, n_{ky}, n_{kz})$.

And wherein $s_p$ is:

$$S_p = \begin{pmatrix} S_{11} \\ S_{12} \\ S_{13} \\ S_{22} \\ S_{23} \\ S_{33} \end{pmatrix} \quad (11)$$

To illustrate one technique for estimating the six coefficients of the covariance matrix $S_p$, the equation 3 is rewritten using the vector $n'_k$ as follows:

$$n'_k \cdot s_p = s_{pk}^2 \quad (12)$$

$s_p$, which contains the terms of the covariance matrix $S_p$, is estimated by forming the k×6 matrix as follows:

$$T = \begin{pmatrix} n_1^T \\ \vdots \\ n_k^T \end{pmatrix} \quad (13)$$

Wherein the k×1 vector is given by:

$$t_p = \begin{pmatrix} s_{p1}^2 \\ \vdots \\ s_{pk}^2 \end{pmatrix} \quad (14)$$

Wherein the constraint on s is given by:

$$Ts_p = t_p \quad (15)$$

In one embodiment of the invention, the foregoing is solved using a typical least squares approach. An alternative embodiment of the invention employs an SVD or pseudo-inverse approach, as long as the rank of $T_p$ is at least 6.

In step 54, the calibration obtained by the process of the invention is verified using an independent data source relating to known features of the object. For example, use of a corner artifact allows independent verification of the sensor calibration. Alternatively, sphere artifacts of different radii can be employed to reveal the effect of curvature on the 3D geometric correction and the sensor noise model.

One skilled in the art will appreciate that the method 40 can be used to implement on-site calibration checks and re-calibration procedures that can extend the working life of the sensor. In one embodiment of the invention, calibration checks are performed at least at 8-hour intervals, and re-calibration procedures at least every week.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for calibrating a non contact range sensor comprising the steps of:

obtaining a scanned image of an object to be inspected using said sensor;

registering said scanned image of said object with a reference image of said object to obtain registered data;

computing deviations between said registered data and data from said reference image;

estimating random noise and bias error based upon said deviations;

compensating said scanned image of said object in accordance with said estimated random noise and bias error.

2. The method of claim 1 including a step of storing said random noise and bias error estimates in memory.

3. The method of claim 1 wherein the step of estimating random noise and bias errors comprises the steps of estimating bias vectors and estimating a covariance matrix based on said normal deviations.

4. The method of claim 1 wherein said reference image comprises Computer Assisted Drawing data pertaining to said object.

5. The method of claim 1 wherein the step of registering is accomplished by a robust closest patch matching (RCP) method.

6. The method of claim 1 wherein the step of computing deviations is accomplished by computing deviations along surface normals.

7. The method of claim 1 wherein the step of estimating random noise includes the step of filtering random noise by applying Gaussian smoothing to normal deviations.

8. A storage medium encoded with machine-readable computer program code for reconstructing an object comprising instructions for causing a computer to implement a method comprising:

obtaining a scanned image of an object using a sensor;

registering said scanned image of said object with a reference image of said object to obtain registered data;

computing deviations between said registered data and data from said reference image;

estimating random noise and bias error based upon said deviations;

compensating said scanned image of said object in accordance with said estimated random noise and bias error.

9. The storage medium of claim 8 wherein the said reference image is a Computer Assisted Drawing (CAD) representation of the object.

10. The storage medium of claim 8 wherein the step of registering the data points is accomplished in accordance with a robust closest patch matching technique.

11. The storage medium of claim 8 wherein the step of computing deviations is accomplished by computing deviations along surface normals.

12. The storage medium of claim 8 wherein the step of filtering random noise includes the step of applying Gaussian smoothing to normal deviations.

* * * * *

UNITED STATES PATENT AND TRADEMARK OFFICE
CERTIFICATE OF CORRECTION

PATENT NO. : 6,411,915 B1  Page 1 of 1
DATED : June 25, 2002
INVENTOR(S) : Van-Duc Nguyen et al.

It is certified that error appears in the above-identified patent and that said Letters Patent is hereby corrected as shown below:

<u>Column 1,</u>
Line 4, "CROSS REFERENCE TO RELATED APPLICATIONS", please insert
-- STATEMENT REGARDING FEDERALLY SPONSORED RESEARCH AND DEVELOPMENT --

The U.S. Government may have certain rights in this invention pursuant to contract number 70NANB5H1085 awarded by the NIST (National Institute of Standards & Technology). --

Signed and Sealed this

Twentieth Day of August, 2002

*Attest:*

*Attesting Officer*

JAMES E. ROGAN
*Director of the United States Patent and Trademark Office*